(12) United States Patent
Dutta

(10) Patent No.: US 7,145,722 B2
(45) Date of Patent: Dec. 5, 2006

(54) OPTICAL FILTER AND METHOD OF MANUFACTURING THEREOF

(75) Inventor: Achyut Kumar Dutta, Sunnyvale, CA (US)

(73) Assignee: Banpil Photonics, Inc., Santa Clara, CA (US)

( * ) Notice: Subject to any disclaimer, the term of this patent is extended or adjusted under 35 U.S.C. 154(b) by 0 days.

(21) Appl. No.: 10/709,225

(22) Filed: Apr. 22, 2004

(65) Prior Publication Data
US 2004/0240064 A1    Dec. 2, 2004

Related U.S. Application Data

(60) Provisional application No. 60/465,066, filed on Apr. 24, 2003.

(51) Int. Cl.
*G02B 5/18*    (2006.01)

(52) U.S. Cl. .................. 359/569; 359/573; 359/571; 359/576

(58) Field of Classification Search ............... 359/569, 359/571, 572, 573, 576
See application file for complete search history.

(56) References Cited

U.S. PATENT DOCUMENTS 4,281,894 A * 8/1981 Guha ................... 359/572

* cited by examiner

*Primary Examiner*—Fayez G. Assaf

(57) ABSTRACT

Novel structure of the optical elements (i.e. filter) to be operated in the long, mid, and near infrared wavelengths of lights is provided. The filter can offer very narrow linewidth, and high reflectivity (or transmissivity) at the peak wavelength. The optical element consists of the substrate, first diffraction grating and single uniform surface, and the second grating. Alternatively, the optical element again consists of the substrate, single uniform surface and the diffraction grating on the top of it. Alternatively, filter may also consist of number of sequence of layers, wherein each sequence comprises the single uniform layer sandwiched by the two diffraction grating layers. Filter again alternatively consists of the number of sequences wherein each sequence comprises the single uniform layer and the single diffraction grating. Diffraction grating may be two-step grating or multilevel grating with synchronously or nonsynchronously samples diffraction gratings.

20 Claims, 15 Drawing Sheets

Table: Materials average refractive index for 3 – 12 $\mu$m

| Materials | Notation | Refractive index |
|---|---|---|
| Barium Fluoride (BaF) (Substrate) | $n_S$ | 1.47 |
| Zinc Sulphide (ZnS) (Uniform Layer) | $n_{C2}$ or $n_2$ | 2.22 |
| Yittrium Oxide ($Y_2O_3$) (Low Index Grating Material) | $n_L$ | 1.69 |
| Diamond (High Index Grating Material) | $n_H$ | 2.37 |
| Air (Superstate) | $n_{C1}$ | 1.0 |

FIG. 4.

Table: Performance comparison between proposed and conventional filters

| Estimated Performance | Fill Factor 0.5 | | Fill Factor 0.3 | | Conventional λ/4 Stacks |
|---|---|---|---|---|---|
| | Single Grating | Double Grating | Single Grating | Double Grating | |
| Peak Wavelength ($\mu$m) | 8.102 | 8.523 | 8.097 | 8.512 | 8 |
| Peak Transmission (%) | >99.9 | >99.99 | >99.99 | >99.99 | >99.99 |
| Bandwidth (nm) | 31.45 | 1.211 | 22.23 | 0.638 | 453 |
| Leakage (%) | <2 | <3 | <2 | <3 | 40 |
| Grating Spacing (μm) | 4.6 | 4.7 | 4.6 | 4.7 | - |
| Thickness (μm) | 1.981 | 3.0613 | 2.0191 | 3.1373 | 100 |

FIG. 8.

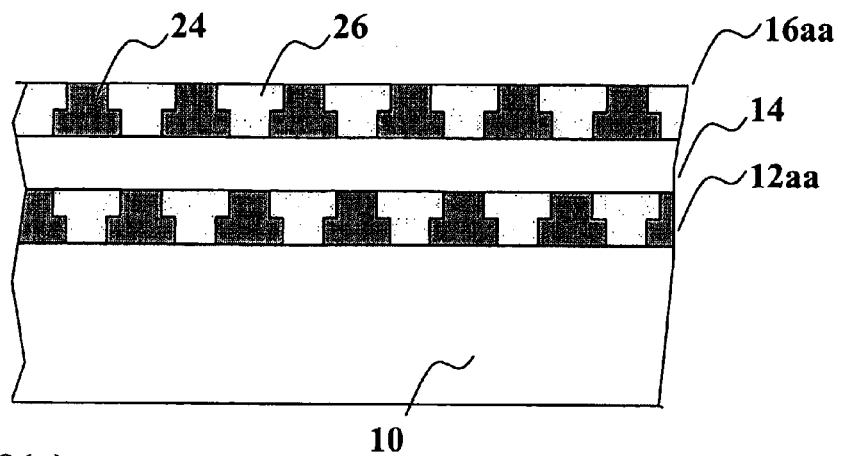
FIG. 10(a)
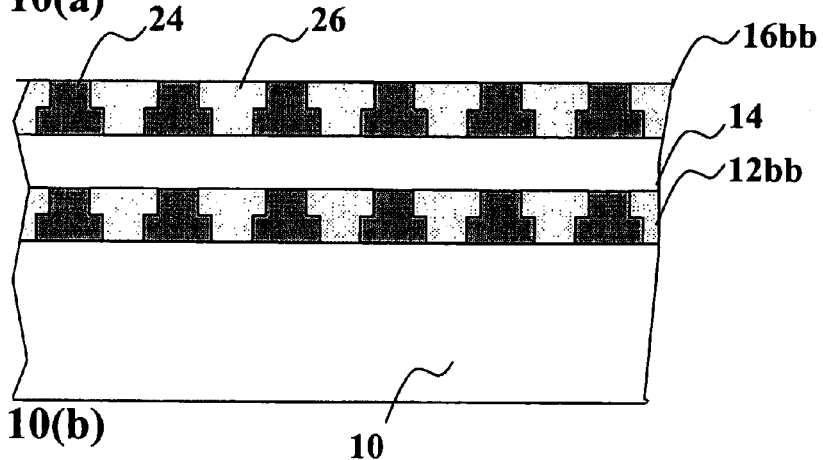
FIG. 10(b)
FIG. 10.

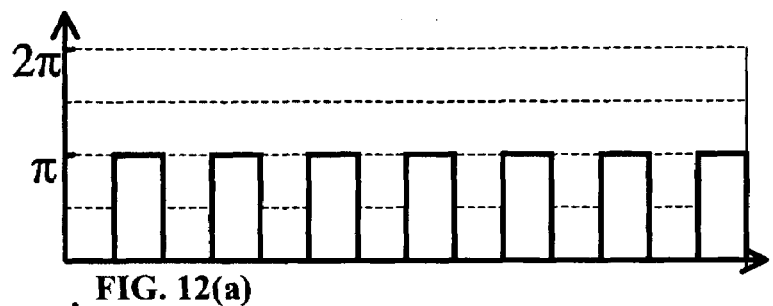
FIG. 12(a)
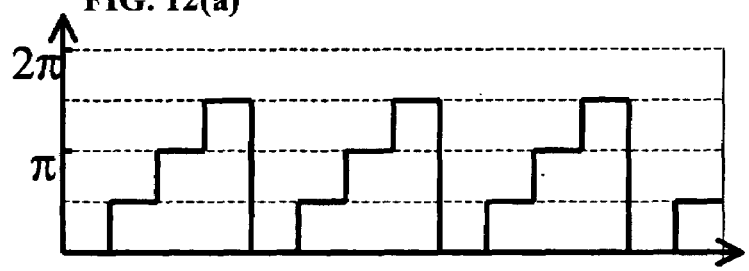
FIG. 12(b)
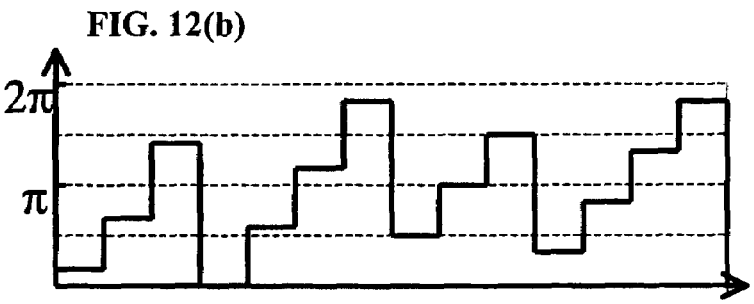
FIG. 12(c)
FIG. 12.

OPTICAL FILTER AND METHOD OF MANUFACTURING THEREOF

CROSS REFERENCE TO RELATED APPLICATIONS

This application claims the benefit of U.S. Provisional Application No. 60/465,066 filed Apr. 24, 2003.

BACKGROUND OF INVENTION

This invention relates to optical filters for producing efficient bandpass reflection and transmission with very narrower line width and low sidebands. More particularly, this invention is related to the means for reflectance and transmission of the radiation (light) of comparatively longer wavelength.

Optical Interference films are used in most optical systems to control or enhance spectral performance. The examples of classical applications include (de) multiplexing, guiding, deflecting and modulation of optical beams for the systems such as holography, integrated optics, optical communications, acousto-optics, nonlinear optics, and spectroscopy. These interference films are thin layers or blends of optical materials of difference refractive index. When light passes through a change in refractive index, partial reflection occurs. The coherence of these subtle reflections determines the nature of the filter's optical spectrum. Conventionally, there are two ways to fabricate the interference filters; (i) Discrete stacks (n$\lambda$/4 thickness, where $\lambda$ and n optical wavelength and integer) and (ii) Rugate. Discrete stack filters are alternating layers of optical materials. Rugate filters on the other hand are a continuous graded, periodic blend of two optical materials.

In the case of discrete stacks light reflected within the high index layers will not suffer any phase shift on reflection while that reflected from a low index layer will suffers a phase shift of 180 degrees. Thus the various component of the incident light produced by successive reflections though out the assembly will appear at the front surface all in phases so that they will combine constructively. This implies that the effective reflectance of the assemble can be made very high indeed, as high may be desired, merely by increasing the number of layers. This is the basis form of high reflectance films. When such coating films are constructed it is found that the reflectance remains high over a limited range of wavelengths, depending on the ratio of high and low refractive indices. Outside this region reflectance changes abruptly to zero. Because of this behavior, the quarter wave stack is frequently used as the basic building block for many types of thin film filter. On the other hands, in the case of Rugate filters, the continuousness of the material refractive index is achieved by mixing ratio of the material blend. This determines the intermediate refractive index of the film. Co-deposition makes Rugate filters extremely challenging to fabricate than discrete stacks.

These two design methodologies provide a technology to fabricate thin film based reflection filters, especially in near infrared regions. When designing the comparatively longer infrared specially mid-infrared or long-infrared ranging from 3 µm to 12 µm, there is a serious limitation. For example, if the filter is optimized for 8 µm then the quarter wave plate thickness comes out to be thick for the IR materials, for examples around 0.83 µm for Zinc Selenide (ZnSe) and 0.89 µm for Zinc Sulphide (ZnS). FIG. 1 shows the simulated results of the filter using sixty pairs of quarter wavelength stacks of ZnSe/ZnS. For 30 pairs of such stacks, we obtain a total thickness around 51 µm and 100 µm for 60 pairs. Total thickness of deposited materials more than few microns give rise to defects like cracks due to excessive stress creation, and thereby, make unstable in fabrication. Besides, under different temperature operation, the filter made from this technique (quarter wavelength stacks) showed unstable due to the crack formation due to mismatching of the thermal coefficient of expansion (TCE). Besides, this unstability in fabrication and operation, the wavelength band (at full wave at half maximum) achieved is also broader. Side lobes are seen at the side of the peak if the quarter-wavelength stacks are used. These could be minimized in some extend by using of Rugate filter design. However we cannot still achieve much narrower bandwidth even using of these two techniques.

It is highly desirable to have a different technique by which the filter can be deigned with lower thickness of the layers and the filter can provide filter specific wavelength having the narrower bandwidth.

According to the current invention, narrow band, high reflectivity optical elements in the mid to long infrared wavelengths for astronomical, commercial, and industrial application can be designed which could be operated under different temperature. The manufacturing thereof is also simpler as compared with the prior art. Some applications include chemical agent detection, atmospheric environment sensing, and laser surgery.

SUMMARY OF INVENTION

Accordingly, it is an object of the invention to provide the technique which could offer the narrower bandwidth for the filtered wavelengths, and the filter can be designed with fewer layers (with lower thickness), different from the conventional thin films of different refractive index stacks.

It is an object of this invention to use the diffraction type of grating sandwiched by the two thin layers, which could offer the narrower wavelength band and high reflectivity.

Alternatively, it is also an object to provide the combination of the grating and thin film to achieve the narrower bandwidth filtering characteristics.

Another object of the present invention is to provide the material types to be used for achieving the narrower filter characteristics for mid to long infrared wavelengths filtering, and their deposition techniques to grow/deposit. These materials are easy to deposit/growth using the standard IC technology.

Another object of the present invention is to provide the fabrication process to fabricate the filter mentioned in this invention using the standard IC fabrication process.

According to the invention, the filter comprises, (i) first grating layer on the top of the substrate;
(ii) an uniform layer on the top of the said first grating, and;
(iii) second grating layer on the top of the uniform layer;

wherein the type of said first and second gratings could be synchronously or nonsynchronously sampled diffracting gratings, and also thickness of the layers are quarter wavelengths.

According to the invention, the filter comprises, (i) first grating layer on the top of the substrate;
(ii) an uniform layer on the top of the said first grating;
(iii) second grating layer on the top of the uniform layer, and;
(iv) k (k is integer where n=1, 2, 3, and so on) number of sequence of layers comprising first grating, uniform layer, and second grating;

wherein the type of said first and second gratings could be synchronously or nonsynchronously sampled diffracting gratings, and also thickness of the layers are quarter wavelengths.

Alternatively, according to the invention, the filter comprises, (i) first grating layer on the top of the substrate, and;
(ii) an uniform layer on the top of the said first grating;

wherein the type of said first and second gratings could be synchronously or nonsynchronously sampled diffracting gratings, and also thickness of the layers are quarter wavelengths.

Alternatively, according to the invention, the filter comprises, (i) first grating layer on the top of the substrate;
(ii) an uniform layer on the top of the said first grating, and;
(iii) k (k is integer where n=1, 2, 3, and so on) number of sequence of layers comprising first grating, and uniform layer;

wherein the type of said first and second gratings could be synchronously or nonsynchronously sampled diffracting gratings, and also thickness of the layers are quarter wavelengths.

Alternatively, according to the invention, the filter comprises, (i) an uniform layer on the top of the substrate;
(ii) a grating layer on the top of the uniform surface; and;
(iii) k (k is integer where n=1, 2, 3, and so on) number of sequence of layers comprising uniform layer and grating.

wherein the type of said first and second gratings could be synchronously or nonsynchronously sampled diffracting gratings, and also thickness of the layers are quarter wavelengths.

According to this invention the grating for the said first and also for the said second gratings covers all kinds of the diffracting gratings falls under synchronously or non-synchronously sampled diffracting gratings.

According to this invention, materials easily deposited using the vacuum deposition technique and also has low loss over Visible to long infrared region are used for the filter. The materials like ZnS, ZnSe, BaF, Y2O3, diamond can be used.

Other material such as SiO2, SiNx, and TiOx can also be used.

The invention offers low line-width with the high reflectivity or transmission characteristics for the desired wavelength of the light. These inventions could be easily implementable as today's manufacturing technology can be used. The methods described in this disclosure enables to make the filter for visible, near infrared, mid infrared or long infrared of wavelengths.

Another advantage of this invention is that conventional material and IC fabrication technology can be usable to fabricate this filter.

Other objects, features, and advantages of the present invention will be apparent from the accompanying drawings and from the detailed description that follows below.

BRIEF DESCRIPTION OF DRAWINGS

The invention will be explained in more detail in conjunction with the appended drawings wherein.

FIG. 4 is the table summarizes the type of the materials used in the simulation, in the second embodiment in accordance with this present invention;

FIG. 8 is the table summarizing the expected results in the fourth embodiment for the filter structures as shown in FIGS. 4 and 6 (reflective type for example) and the materials as shown in FIG. 4. Conventional quarter-wavelength stacks based filter performance is also shown in FIG. 8 for comparison;

FIG. 10(a) and FIG. 10(b) are the schematic showing an example of the cross-sectional views of the multilevel gratings used as the first and second gratings, in the sixth embodiment in accordance to the present invention;

FIG. 12(a), FIG. 12(b), and FIG. 12(c) are the schematics of diffraction gratings showing the examples of the different phase levels for each pixel for different periods: (a) 2, pixels per period, (b) 4, and 3, 2 pixels per period, in the eight embodiment in accordance to the present invention.

DETAILED DESCRIPTION

Figure 1:
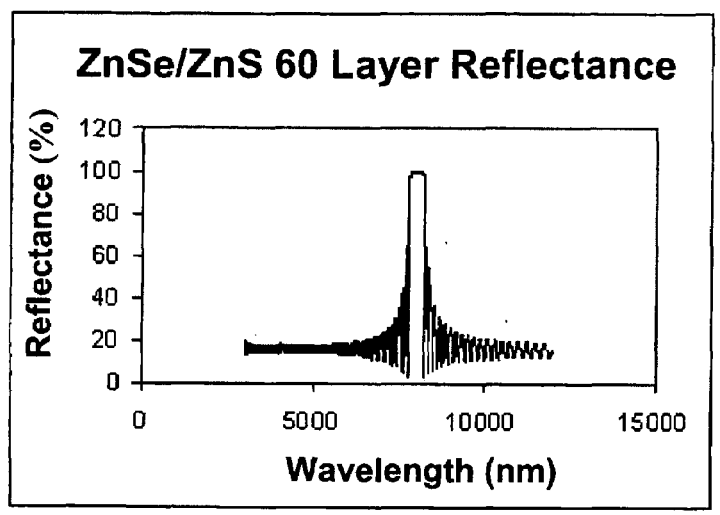
FIG. 1 is the reflection spectrum of the filter consisting of the 60 pairs ZnS/ZnSe quarter wavelength stacks. This is an explanatory diagram showing the prior-art of today's filter using quarter wavelength stacks.

The best modes for carrying out the present invention will be described in turn with reference to the accompanying drawings. In the following description, the same reference numerals denote components having substantially the same functions and arrangements, and duplicate explanation will be made only where necessary.

Here the structure and design we mention are for the reflectance type of filter. However, similar structure can be useful for designing the transmission type filter.

Figures 2A, 2B:
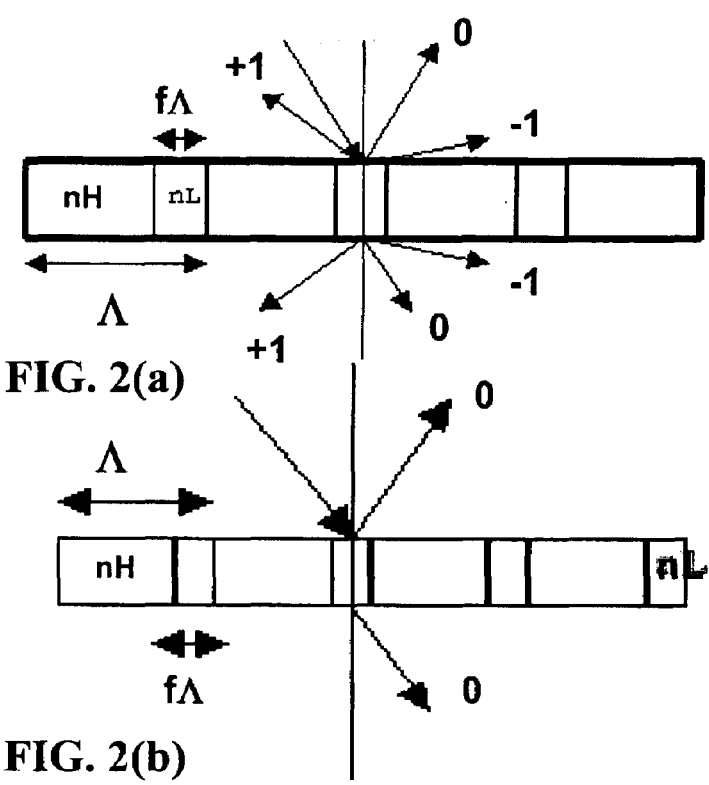
FIG. 2. is the schematics showing a (a) single waveguide grating with larger spacing and (b) single waveguide grating with smaller grating spacing according to this invention. □ indicates the grating period and f indicates the fill factor.

FIGS. 2(a) and 2(b) shows a resonant waveguide grating consisting of a periodic structure where Λ is the grating period and f is the fill factor. We observe the incident and diffracted waves. On coupling the externally propagating waves to the waveguide modes, sharp resonance phenomenon arises. These resonances occur when one of the diffracted waves generated by the grating element gets phase matched to the leaky mode of the waveguide structure. This can be achieved by making the grating spacing smaller than the resonant wavelength as shown in FIG. 2(b). This causes the higher order diffracted waves to be evananescent. This makes it possible for the zero order to complete energy exchange between forward and backward propagating wave. Thus, at resonance wavelength a sharp reflection peak occurs i.e. guided mode resonance occurs. This is the basis of obtaining high reflectance at a specific wavelength. Thus, the high reflectance is a combination of waveguide mode induced resonance and thin film interference effects. Since, the gratings are high spatial frequency waveguide gratings, the grating layer is approximated by its equivalent homogeneous layer having refractive index equal to the average refractive index of the grating layer. Thus by applying thin film interference theory, the off resonance response of the waveguide grating can be understood. We propose the filter structure comprising the thin film grating and single layer, which expect to provide the high reflectivity and narrow line width at the peak wavelength.

The achieving high reflectivity filter requires selecting the material and substrate operates in long infrared. Much of the work on filter as used in optical communication operates near infrared wavelength. Another objective is to identify material, substrate and their deposition technique. We propose a high reflectivity filter designs (including materials) and their fabrication process.

As mentioned previously, it is very straight forward that increasing the quarter wavelength stacks of uniform layers, as used conventionally can able to reduce the linewidth and also offer the high reflectivity. However, for the filter operated in the mid and long infrared regions requires thicker stacks, total thickness as high as 50 to 100 μm, which makes difficulty in the fabrication and also makes instability in the operation due to the mismatching of thermal coefficient of expansion (TCE). It is therefore, required a filter structure, which has total thickness, ranges from 1 to 5 μm and can be fabricated using the standard IC manufacturing technology.

In the preferred embodiments explanation, first the filter structures will be explained with the simulated results, and the later part of this section cover the fabrication of the filters.

Figure 3:
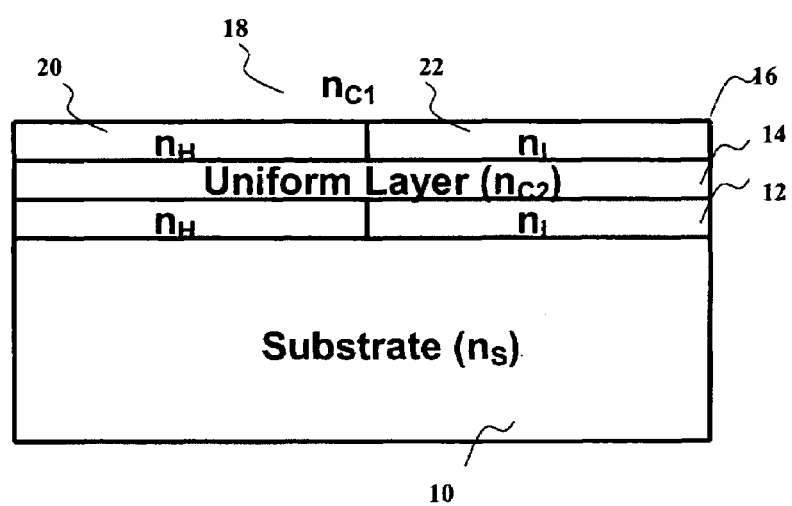
FIG. 3 is the schematic showing the cross-sectional view of a filter structure having a double gratings and a single uniform layer in the first embodiment in accordance to the present invention.

FIG. 3 is the schematic showing the cross-sectional view of a filter structure having a double gratings and a single uniform layer in the first embodiment in accordance to the present invention. In the preferred embodiment, the first grating 12 is located on the top of the substrate 10. The uniform layer 14 is located/sandwiched by grating layer 12 and 16. The upper most layer 18 is considered to be air. At resonance, strong coupling occurs between the external propagating waves and the adjacent evanescent waves, with the resonance effects dominating the thin anti-reflection coating (AR) effects. For the grating structure shown in FIGS. 3, the AR requirements are satisfied by selecting the thickness of the layers to be equal to the quarter of the resonance wavelength and the refractive indices obeying the condition $n_2^2/n_{1,av} = n_S/n_C$ where $n_{1,av}$ is the average refractive index of the top layer, $n_2$ is the refractive index of the uniform layer, and $n_S$, $n_C$ are the refractive indices of the substrate and cover respectively. Thus, reflectance can be lowered over an extended spectral range without reducing the peak response. The thickness of grating and uniform layers estimated were 1.08 μm and 0.9 μm, respectively for 0.5 fill factor and 1.12 μm and 0.9 μm, respectively for fill factor of 0.3. For the simplicity of the drawing, we have considered the synchronous sampled diffraction gratings of 20 and 22, having the refractive indices of $n_H$(high) and $n_L$(low). However, the diffraction grating could be any kinds of gratings either synchronously sampled or nonsynchronously gratings having either single level or multilevel (not shown) steps. The $n_S$, $n_{C1}$, and $n_{C2}$ are the refractive indices of the substrate, topmost layer, and uniform layer used in the filter structure as shown in FIG. 3.

In filter design, the materials to be used in the filter are to be considered in the filter design. Based on the material properties (e.g. refractive index, the attenuation etc), the filter properties vary. For designing the filter able to operate in the mid and long infrared region, we have considered the material systems, which have low loss over broad spectral regions (from UV to long IR), and also comparatively higher refractive indices. The material considered is summarized in Table as shown in FIG. 4 as the second preferred embodiment, in accordance to the present invention. In the preferred embodiment for citing the simulated results, we have considered BaF as the substrate, $Y_2O_3$ (Yttrium Oxide) as the low index grating material, diamond as the high index grating material, and ZnS as the uniform layer. However, any combination could be used with well designed structure mentioned in the first embodiment.

Figure 5A:
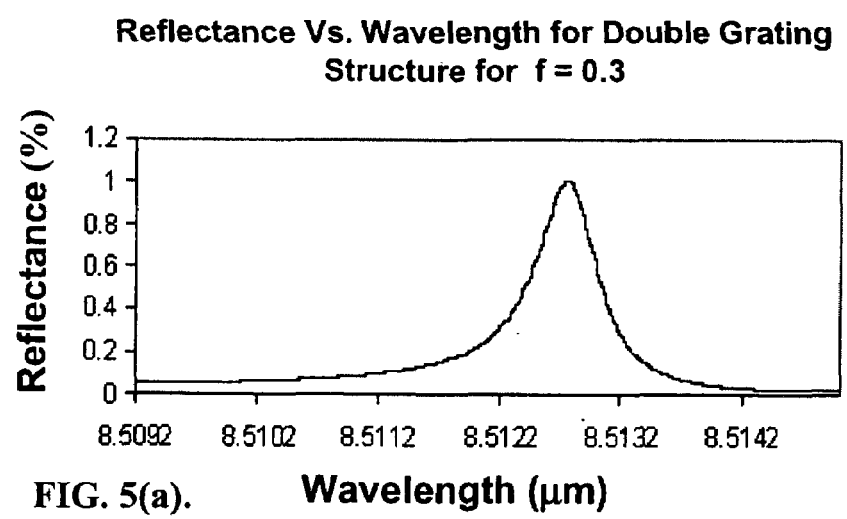
FIGS. 5(a) and 5(b) are the simulated results of the structure as shown in FIG. 3, for the grating period (□ of 0.3 and 0.5, respectively, according to this invention. Other parameters used in the simulation are summarized in the Table, as shown in FIG. 4.
Figure 5B:
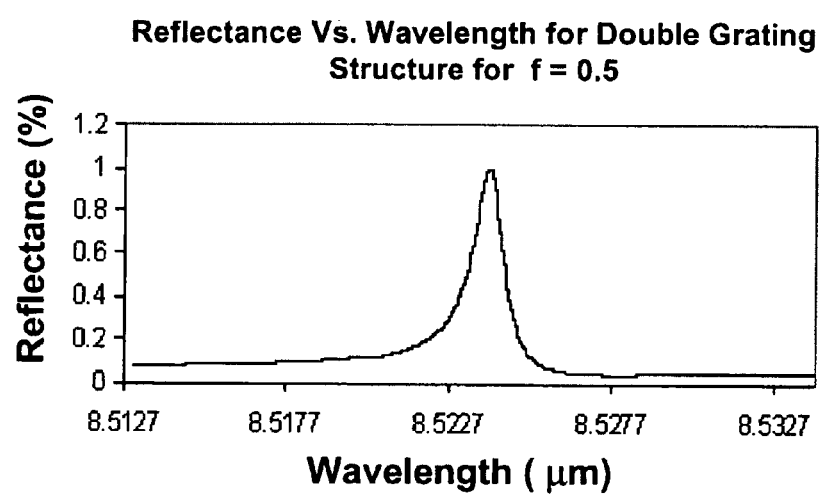

FIG. 5(a) and FIG. 5(b) are the simulated results for the filter structure as shown in FIG. 3, for the grating period of 0.3 and 0.5. Grating structure having grating spacing of 4.7 microns is used in the simulation. Other parameters used in the simulation are summarized in Table, as shown in FIG. 4. The filter structure is optimized for the wavelength of 8 μm filtering (reflective type). The results suggested that the line width as low as 0.6 nm is possible for the 0.3 grating period and the line width increase to 1.2 nm if the grating period is increased to 0.5. Narrow linewidth as small as sub-nanometer range filter can be achieved using the proposed structure for the long IR reflective type filter. The reflectivity achieved also is over 99%.

Figure 6:
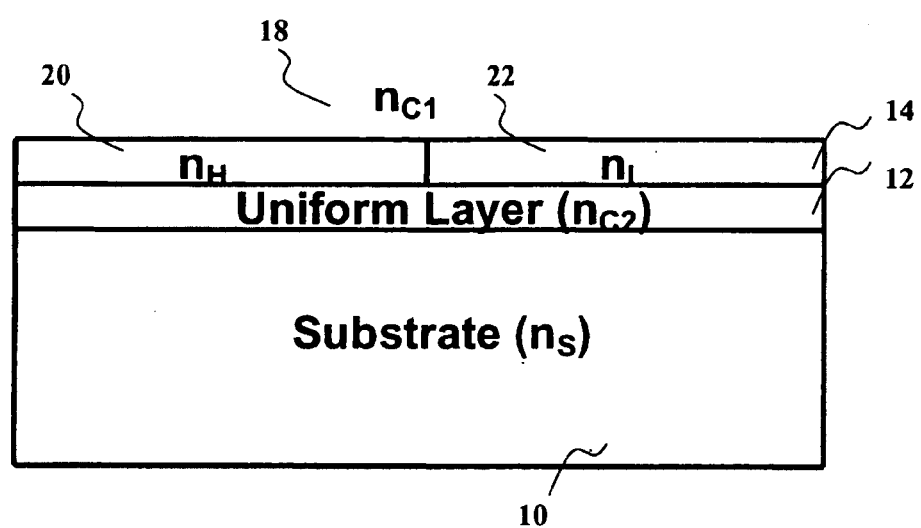
FIG. 6 is the schematic showing the cross-sectional view of a filter structure having a single grating and a single uniform layer in the third embodiment in accordance to the present invention.

FIG. 6 is the schematic showing the cross-sectional view of a filter structure having a double gratings and a single uniform layer in the third embodiment in accordance to the present invention, wherein the same numerals represents same parts mentioned before, so that repeated explanations are omitted here. In the preferred embodiment, the uniform layer 12 is located on the top of the substrate 10. The grating layer 14 is located on the top of the uniform layer 12. The upper most layers 18 are considered to be air. For the simplicity of the drawing, we have considered the synchronous sampled diffraction gratings of 20 and 22, having the refractive indices of $n_H$ (high) and $n_L$ (low). However, the diffraction grating could be any kinds of gratings either synchronously sampled or nonsynchronously gratings having either single level or multilevel (not shown) steps. The $n_S$, $n_{C1}$, and $n_{C2}$ are the refractive indices of the substrate, topmost layer, and uniform layer used in the filter structure as shown in FIG. 6.

Figure 7A:
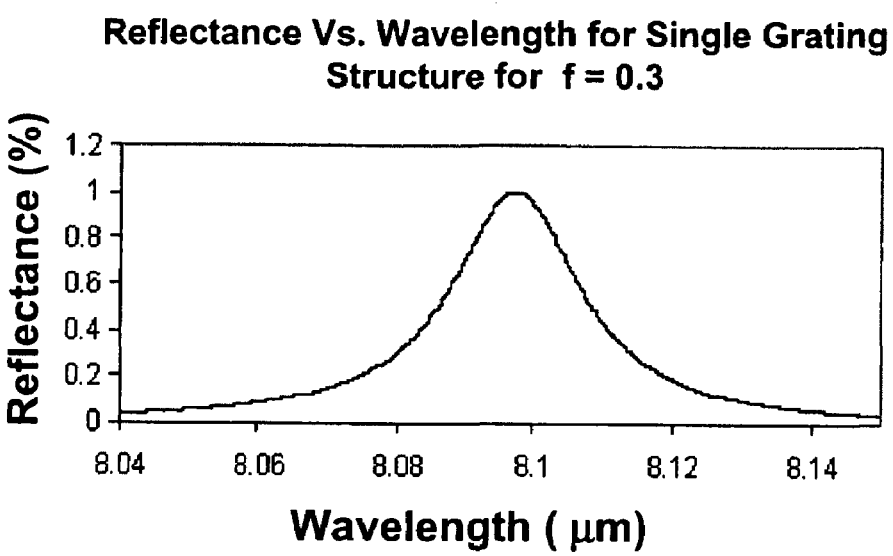
FIGS. 7(a) and 7(b) are the simulated results of the structure as shown in FIG. 5, for the grating period (□ of 0.3 and 0.5, respectively, according to this invention. Grating structure having grating spacing of 4.6 μm is considered in the simulation. Other parameters used in the simulation are summarized in Table I.
Figure 7B:
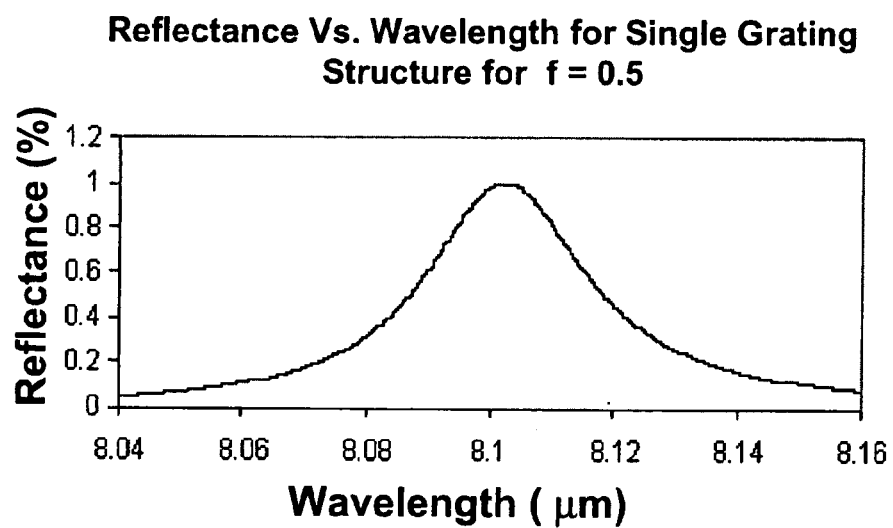

FIG. 7(a) and FIG. 7(b) are the simulated results for the filter structure as shown in FIG. 6, for the grating period of 0.3 and 0.5. Grating structure having grating spacing of 4.6 μm is used in the simulation. Other parameters used in the simulation are summarized in Table as shown in FIG. 4. The filter structure is optimized for the wavelength of 8 μm filtering (reflective type). The results suggested that the line width as low as 22.2 nm is possible for the 0.3 grating period and the line width increase to 31.4 nm if the grating period is increased to 0.5. More narrower linewidth can be expected with optimizing the physical parameters of the proposed structure for the long IR reflective type filter. The reflectivity achieved also is over 99%.

FIG. 8 shows the Table summarizes the performances of the reflective type filter designed for 8 µm for the structure as shown in FIGS. 3 and 6 and for the material as mentioned in FIG. 4, in the third preferred embodiment. For comparison, performance for the filter made from conventional quarter-wavelength stacks layers are also shown in FIG. 8. Results indicated that high reflectivity as high as >99% and narrow bandwidth below <0.6 nm (see FIGS. 5) can be achievable using the proposed design. Simulated results also indicated that narrower bandwidth could be achievable reducing the fill factor. The leakage is also very small (<5%) for both designs.

The above calculation for the proposed design structure is for the material combination as summarized in Table of FIG. 4. Other combination of the grating and single layer and/or their sequences can also be applied. For sake of the simplicity we have considered the material combinations as mentioned in FIG. 4, their different combination and/or with other materials or the alloy formed from the material combination from II–VI periodic table can also be considered.

Figure 9:
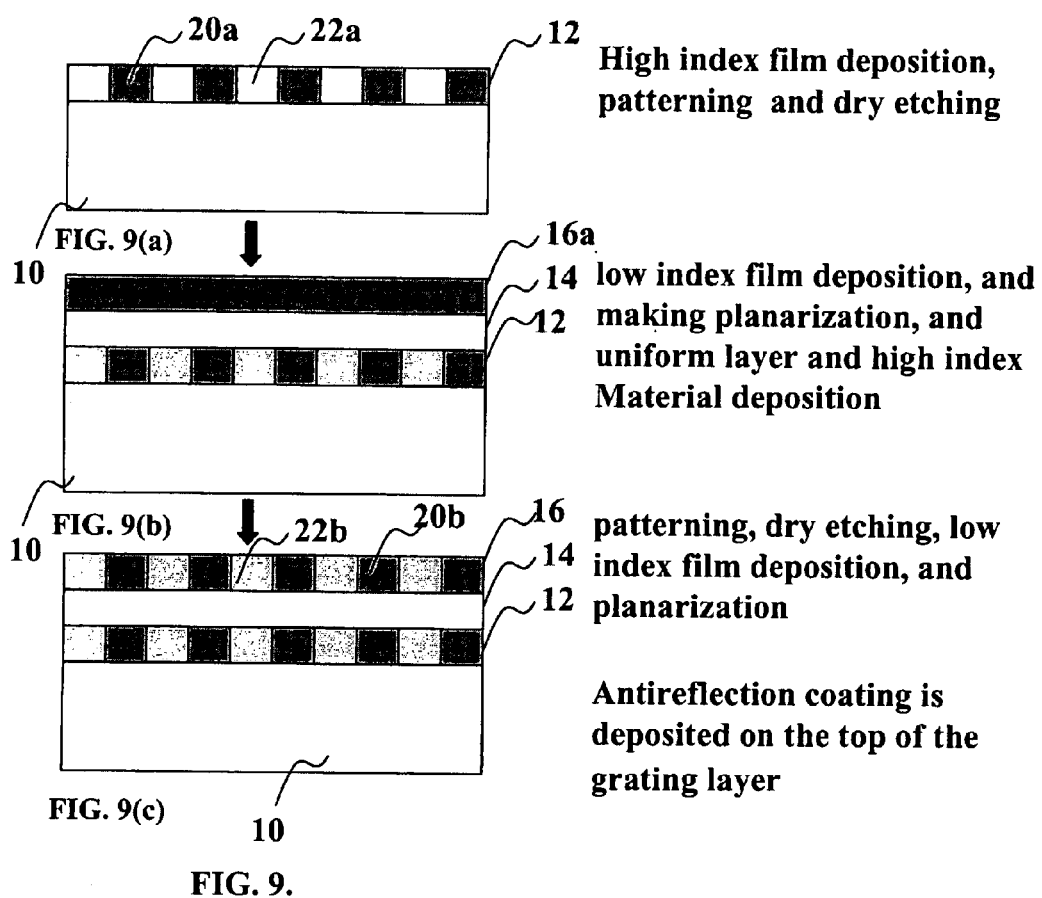
FIG. 9(a) to FIG. 9(c) is the schematic showing the fabrication process of the filter in the fifth embodiment in accordance to the present invention.

FIGS. 9(a) to 9(c) are the schematic showing the fabrication process of the filter in the fifth embodiment in accordance to the present invention wherein the same parts are represented by the same numerals so that repeated explanation is omitted here. This fabrication process described here is only for example, any kinds of the filter structure consisting of grating and uniform layers can be fabricated using the fabrication process herewith described.

In the preferred embodiment, the material system either as shown in FIG. 4, or any combination of material or alloys from the II–VI periodic table can be used. After depositing the high refractive index material 20 (e.g. diamond) on the substrate 10 (e.g. BaF), dry etching following the patterning can be used to make the grating of high index. This is followed by the deposition of the low index material 22 (e.g. $Y_2O_3$), and planarization using the chemical mechanical polishing (CMP) technique. After that the uniform layer 14 (ZnS) and the grating layer of 16a is formed subsequently on the top of the first grating 12. Second grating 16 exactly the same way as the first grating 12, so that the repeated explanation is omitted here.

For depositing the thin film having thickness of the quarter wavelength, conventional vacuum deposition techniques frequently used in IC industry, such as sputtering, evaporation or chemical vapor deposition techniques can be used. In the preferred embodiment we have mentioned to make the grating after forming the patterning using standard photolithography technique and subsequent dry-etching process using such as reactive ion etching (RIE) or reactive ion beam etching (RIBE) technique. The grating can be made using the laser drilling using the high power laser such as Excimer laser or so.

For simplicity in the design and also describing the fabrication process, we have considered 2 steps gratings having phase depth of 0 and π radian. Multilevel grating can also be used, and can be formed using of the multi-etching process steps. Alternatively, gray-scale photolithographic masks where single etching process is necessary, can be used to make the multilevel grating.

FIG. 10(a) and FIG. 10(b) are the schematic showing the cross-sectional view as an example of the multilevel grating used in the filter structure in the sixth embodiment according to the present invention, wherein the like parts represents the like numerals so that repeated explanations are omitted here. In the preferred embodiment, multilevel gratings 24 and 26 can be used as the low and high index gratings, and they could be formed as the same periodicity layers between 12bb and 16bb (FIG. 10(b)) or just opposite periodicity layers between 12aa and 16aa (FIG. 10(a)).

The present invention has been described above by way of its embodiments. However, those skilled in the art can reach various changes and modifications within the scope of the idea of the present invention. Therefore it is to be understood that those changes and modifications also belong to the range of this invention. For example, the present invention can be variously changed without departing from the gist of the invention, as indicated below.

According to the present invention, it is our object to have the filter structure, which could provide the narrow linewidth, and high reflection (transmission) for mid and long infrared region. In the preferred embodiments as explained above from FIGS. 3 to 10, reflective type filter for mid and long infrared light are mentioned similar structure (only based on the well design) transmission filter can be designed. In addition, for example, we have shown the data for the filter designed at the peak wavelength of 8 µm. Similar structures with optimizing the physical parameters and also the optimize selection of the material (considering the materials optical properties e.g. refractive index and loss), the reflective type filter having the peak wavelength reflection in between 3 to 10 um wavelength of lights, can also be designed using similar approach.

In the preferred embodiments, performances are calculated considering the substrate and materials, which are easily available, and also are friendly to manufacturing. For substrate material, we choose Barium Fluoride (BaF) having refractive index 1.47, due to its high transmission over wide range of spectral wavelengths (from 0.15 to 12.5 µm), and also its availability as the wafer from commercial source. Other filter materials used for fabrication are ZnS, Yttrium Oxide ($Y_2O_3$), Diamond, due to their high transmission and also their easy deposition, and also their low coefficient of thermal expansion (CTE). Other materials showing high transmittance in longer wavelengths of light and stable also covers this invention. The single material like diamond or alloy formed by the combination of II–VI (in periodic Table) materials such as ZnO, ZnSe etc.

Figure 11A:
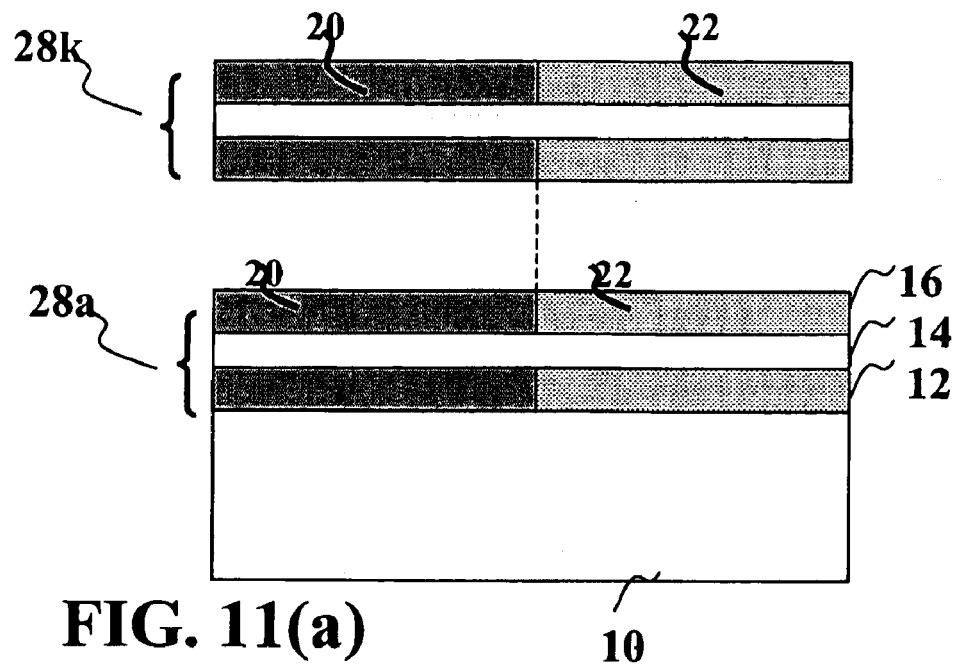
FIG. 11(a), FIG. 11(b), and FIG. 11(c) are the schematics showing the cross-sectional views of the filter structures in the seventh embodiment in accordance to the present invention.
Figure 11B:
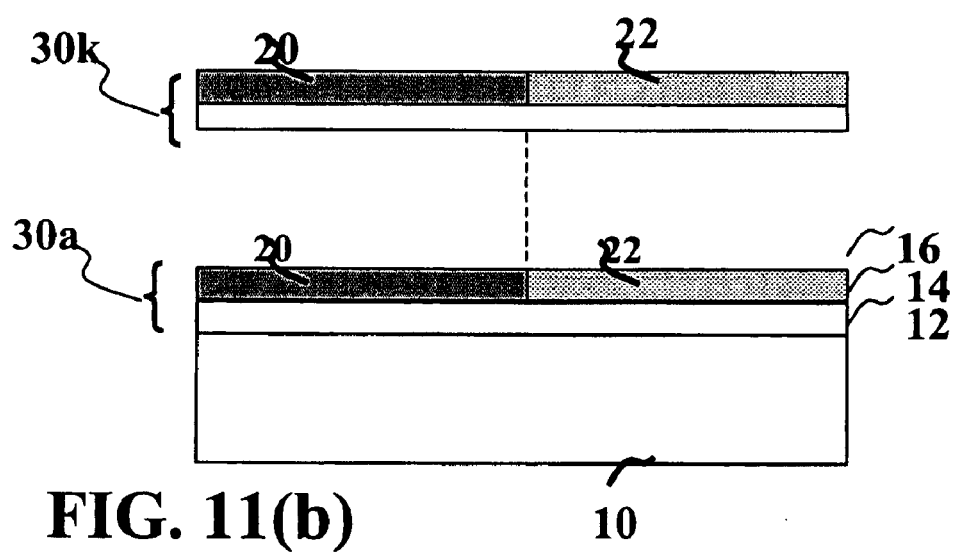
Figures 11, 11C:
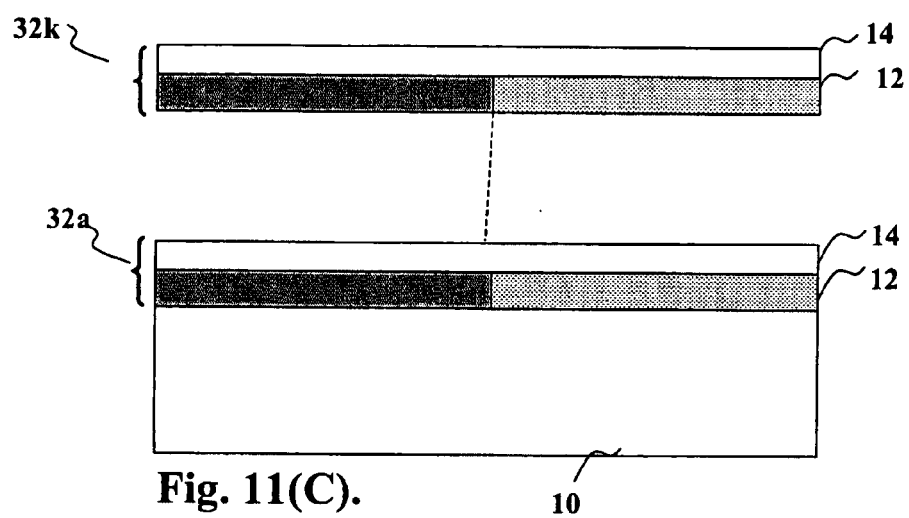

According to the invention, alternatively, a single uniform layer sandwiched by the two grating layers can also form the filter structure. The filter can be formed by forming k (k is the integer, where k=1, 2, 3 . . . ) number of sequences, wherein each sequence consist of the single layer sandwiched by two grating layers. FIGS. 11(a), 11(b) and 11(c) are the schematics showing the different filter structures in the seventh embodiment in accordance to the present invention, wherein the same numerals represents the like parts as mentioned previously, so that repeated explanations are omitted here. Here k (where k=1, 2,3, 4,) number of sequence of the layers like 28k, 30k, and 32k forms the different filters.

Also in the preferred embodiment, the filter structure can have the AR coating at the top of the layer (not shown) where the incident beam is incident, to reduce the reflection loss. This AR coating can be designed using the standard technology.

According to this present invention, alternatively, the filter structure can be formed by a single grating and single uniform surface wherein the grating is formed on the top of the substrate. The filter can be formed by forming k (k is the integer, where n=1, 2, 3) number of sequences, wherein each sequence consist of the single uniform layer and single grating layer, as shown in FIG. 11(c).

Alternatively, according to the present invention, grating can be made on the top of the substrate surface. This helps to eliminate a grating layer and makes the filter thickness thinner.

In the preferred embodiment described from FIGS. 3 to 10, the grating considered is the two-step type having phase depth of 0 and Π radian. The multilevel gratings having the steps N>2, synchronously or nonsysnchronously samples gratings can be used. FIG. 12(a), FIG. 12(b), and FIG. 12(c) are the example of the diffraction grating showing the phase levels for each pixel for different periods in the eight embodiment in accordance to the present invention.

The present invention is expected to be found practically use in astronomical observatory instrument, military surface preparation, chemical agent detection system, and also in the free-space laser communication where the longer infrared wavelengths are used.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical element comprising:
   a substrate;
   a first diffraction grating layer comprising with two adjacent dissimilar materials formed on a first plane;
   a second diffraction grating layer comprising with two adjacent dissimilar materials formed on a second plane, and;
   a single uniform layer sandwiched by said first diffraction grating layer and said second diffraction grating layer.

2. An optical element comprising:
   the said substrate as claimed in claim 1; and,
   A single or multiple sequences of layers, wherein each sequence comprising;
      the said first diffraction grating layer as claimed in claim 1;
      the said single uniform layer as claimed in claim 1; and
      the said second diffraction grating layer as claimed in claim 1.

3. An optical element comprising:
   the said substrate as claim in claim 1;
   the said single uniform layer as claimed in claim 1; and
   the said first diffraction grating layer as claimed in claim 1.

4. An optical element comprising:
   the said substrate as claimed in claim 1; and
   a single or multiple sequences of layers, wherein each sequence comprising:
      the said single uniform layer as claimed in claim 1; and
      the said first diffraction grating layer as claimed in claim 1.

5. An optical element comprising:
   the said substrate as claimed in claim 1;
   the said first diffraction grating layer as claimed in claim 1; and
   the said single uniform layer as claimed in claim 1.

6. An optical element comprising:
   the said substrate as claimed in claim 1; and
   a single or multiple sequences of layers, wherein each sequence comprising:
      the said first diffraction grating layer as claimed in claim 1; and
      the said uniform layer as claimed in claim 1.

7. The said first diffraction grating as claimed in the claim 1 have the grating patterns with 2 or more steps per period and they are synchronously or nonsynchronously sampled diffraction gratings.

8. The steps of grating patterns as claimed in claim 7 are having the phase depths, which are in a binary or non-binary sequences.

9. The said first diffraction grating as claimed in the claim 1 are the type of angle dependent or independent to the incident beam.

10. The material type for the said substrate as claimed in claims 1, is barillium fluoride (BaF), or diamond, or zinc sulphide (ZnS) or zinc selenide (ZnSe) or zinc oxide (ZnO) for the near to long infrared wavelengths of lights.

11. The material type for the said substrate as claimed in claim 1 is doped or nondoped type glass or semiconductor having transmissive characteristic over particular spectral region.

12. Materials having the refractive indices in between 1.6 and above for the said uniform layer as claimed in claim 1, in between 1.0 and 3.0 for one of the material used in the said first or second diffraction gratings as claimed in claim 1, in between 1.5 to 3.5 for other material used in the said first or second diffraction gratings as claimed in claim 1, and in between 1.42 to 2.5 for the said substrate as claimed in claim 1, can be used for the optical elements as claimed in claim 1.

13. The materials for the said first or second diffraction gratings, as claimed in claims 1, are yttrium oxide as the low index material and diamond as the high index material, and the material for the uniform layer, as claimed in claims 1 is zinc sulphide.

14. The materials for the said first or second gratings, as claimed in claim 1 are two material combination for the low-index and high index materials which are from $ZrO_2$, $HfO_2$, $Si_3O_4$, or $Y_{2O3}$.

15. The materials for the said uniform layer, as claimed in claim 1 are $TiO_2$, $SiO_2$, $Si_3O_4$, $ZrO_2$, ZnS, ZnSe, ZnO, $HfO_2$, $Si_3O_4$, or $Y_2O_3$.

16. The thickness of the first or second diffraction grating layer and said uniform layer, as claimed in claim 1 is either quarter-wavelength or n times quarter-wavelength, wherein n is the integer where n=1, 2, 3, 4 and so on.

17. The said first or second diffraction grating layers as claimed in claim 1, separated by the said uniform layer as claimed in claim 1, is formed in a way that either low or high refractive indices are in the same position or in the different position.

18. The optical elements as claimed in claim in 1 are also covered with antireflection coating to reduce the loss.

19. The fabrication process of the optical elements as claimed in claim 1, having single or multiple sequences of processes, wherein each sequence process comprises,
   (a) formation of gratings on the top of the substrate using the processes that comprises,
      (i) the low or high index material deposition using the vacuum deposition technique;
      (ii) photolithography-based patterning;
      (iii) dry etching;
      (iv) deposition of the high or low index material using the vacuum deposition technique; and
      (v) planarization;
   (b) deposition of the uniform layer on the top of the said grating, and;
   (c) formation of the said grating.

20. The diffraction grating formation according to the claim 19 includes the process of laser drilling or process of gray-scale photolithography mask.

* * * * *